United States Patent [19]

Donovan

[11] 4,348,136

[45] Sep. 7, 1982

[54] SPILL OIL CONTAINMENT SYSTEM

[75] Inventor: David M. Donovan, New Orleans, La.

[73] Assignee: Waldemar S. Nelson & Co., New Orleans, La.

[21] Appl. No.: 225,326

[22] Filed: Jan. 15, 1981

[51] Int. Cl.³ ............................................. E02B 15/04
[52] U.S. Cl. ........................................ 405/65; 405/66
[58] Field of Search ..................... 405/63, 64, 65, 70, 405/72, 66; 210/242.3, 923

[56] References Cited

U.S. PATENT DOCUMENTS

| | | | |
|---|---|---|---|
| 2,240,567 | 5/1941 | Meacham et al. | 405/65 |
| 3,756,294 | 9/1973 | Rainey | 405/65 X |
| 3,766,738 | 10/1973 | Gauch | 405/65 |
| 3,906,732 | 9/1975 | Tedeschi, Jr. | 405/72 X |
| 3,973,406 | 8/1976 | Casey | 405/66 |

FOREIGN PATENT DOCUMENTS 55-148816  11/1980  Japan ..................................... 405/65

*Primary Examiner*—David H. Corbin
*Assistant Examiner*—Nancy J. Pistel
*Attorney, Agent, or Firm*—Diller, Ramik & Wight

[57] ABSTRACT

This invention relates to containment booms and more particularly to a device particularly adapted for attaching a containment boom to any ferromagnetic surface at the water line, the device including a base member in the form of an elongated arm having a medial portion and opposite end portions, a float at the medial portion of the arm for imparting buoyancy to the device relative to a body of water, a magnet carried by a first of the opposite end portions for magnetically attaching the device to a ferromagnetic surface, a second of the opposite end portions including a loop for connecting a line thereto for applying a force to the device to detach or disconnect the magnetic connection thereof with an associated ferrometallic surface, and first and second couplers for respectively fixedly and movably connecting a containment boom to the device.

29 Claims, 5 Drawing Figures

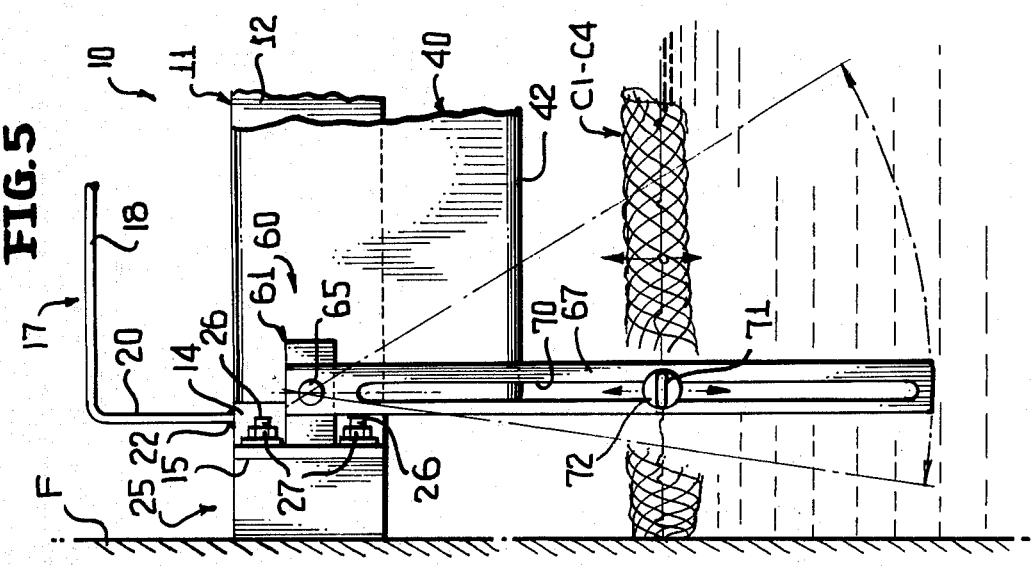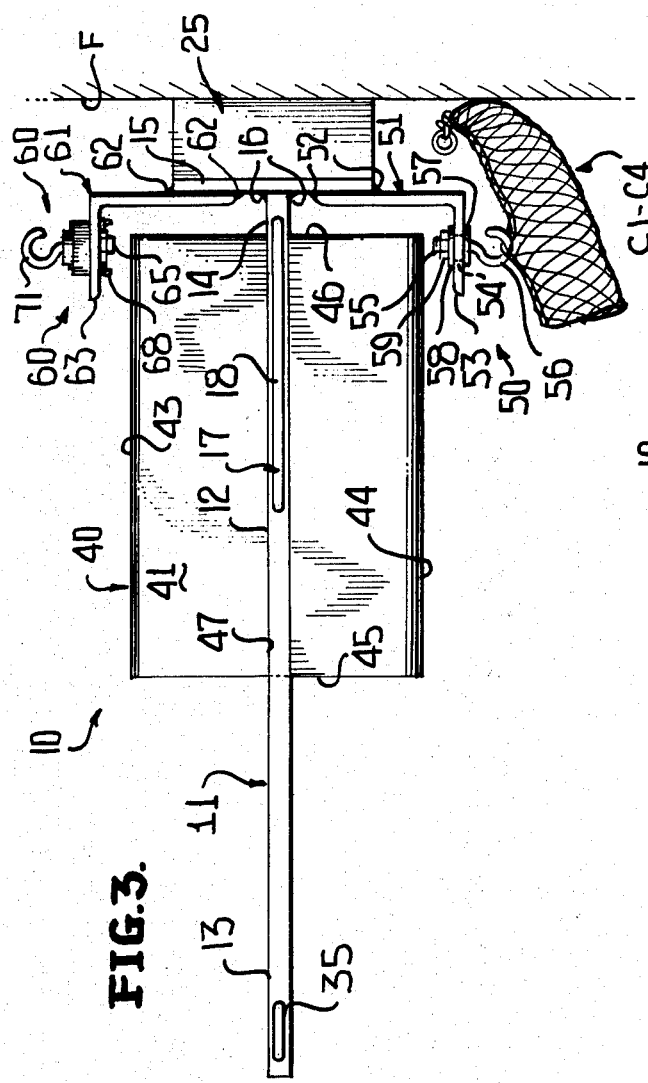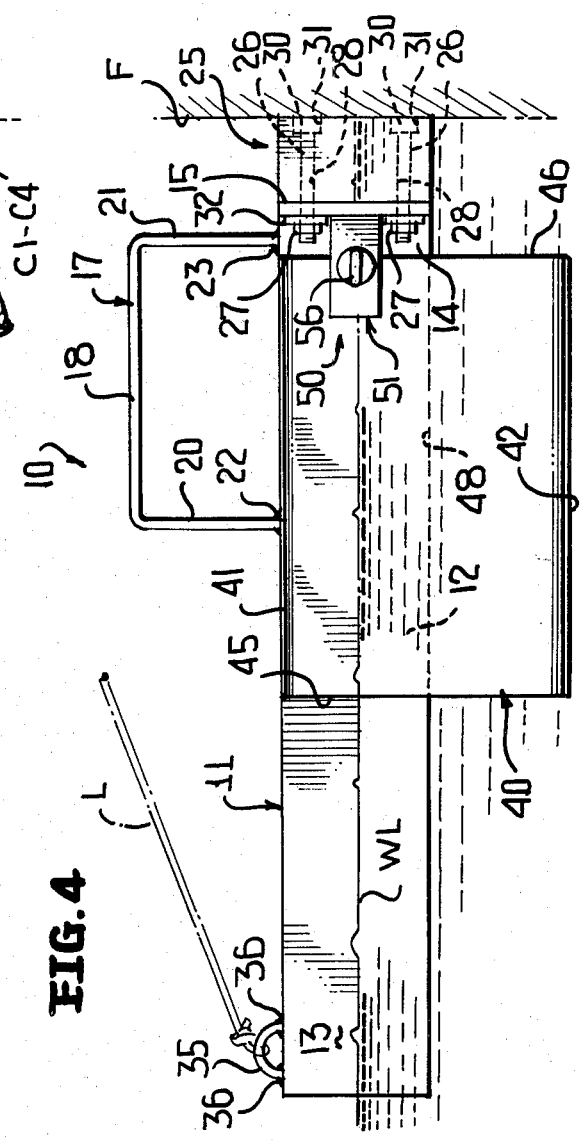

SPILL OIL CONTAINMENT SYSTEM

This invention relates to a containment boom and more specifically to a device particularly adapted for attaching a containment boom to any ferrometallic surface, be it stationary or floating, at the water line of an associated body of water.

Conventional containment booms are deployed in harbors, rivers, lakes and the like to contain a possible spill or an actual spill, such as an oil spill, and typically such containment booms are connected at opposite ends to devices for connecting the containment booms to pilings, docks, vessels, barges, etc. Typical of such applications are those disclosed more fully in U.S. Pat. Nos. 3,630,891; 3,766,738; 3,906,732; 3,973,406; 4,003,206; and 4,120,788. The present invention constitutes an improvement in typical conventional devices, represented by these patents, for attaching such containment booms to associated objects and particularly to ferrometallic surfaces such as steel docks, bulkheads, barge or other type of vessel hulls, etc.

Preferably, the device of this invention includes a base member carrying means for magnetically attaching the base member to a stationary or floating ferromagnetic surface, means carried by the base member for imparting buoyancy to the base member relative to a body of water, and means carried by the base member for attaching the base member to a floating element, such as a containment boom, whereby the device functions as the connecting intermediary between the floating or stationary ferrometallic surface and the floating containment boom.

A further object of this invention is to provide a novel attachment device of the type immediately aforesaid wherein the buoyancy imparting means is a flotation member disposed at a medial portion of the base member, and the last-mentioned attaching means includes first and second attaching members mounted respectively at a fixed position and for relative sliding and/or pivoting movement respectively relative to the base member for attaching the confinement boom thereto in fixed and movable modes of operation.

Still another object of this invention is to provide a novel device of the type aforesaid wherein the base member includes a loop or the like at one end for connecting a line thereto which is remote from a bar magnet functioning to magnetically attach the base member to a ferrometallic surface whereby a line can be connected to the base member and a force imparted therethrough to disconnect or break the magnetic attachment of the base member to the ferromagnetic surface thereby allowing the device to be removed from a body of water by a person without the need of a boat or any other waterborne means of transportation.

Still another object of this invention is to provide a novel device as aforesaid wherein an elongated member is provided having a slot therein along which slides a hook or the like adapted to be connected to a confinement boom whereby the vice will rise as the ferrometallic surface rises under the influence of wave motion whereas the slot permits limited movement of the containment boom relative to the device and the associated floating ferrometallic surface.

Yet another object of this invention is to provide a novel device as last described including means for pivotally attaching the slotted elongated member to the base member thereby permitting both vertical sliding motion and motion transverse thereto by the confinement boom.

Still another object of this invention is to provide a novel device as aforesaid wherein the buoyancy imparting means or float defines a fulcrum of the device, the magnetic attaching means defines the point of load, and the line connecting means defines the point of force application, such that the base member thereby defines a lever arm for readily disconnecting the device from an associated ferrometallic surface.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a schematic view top view of a typical containment boom deployment arrangement, and illustrates a plurality of containment booms secured by devices of this invention to both stationary and floating ferromagnetic surfaces.

FIG. 2 is a perspective view of the attachment device of this invention, and illustrates a base member carrying a float and a block magnet for magnetically attaching the base member to a ferromagnetic surface, the base member further including a pair of hooks, one being stationary and the other being mounted for sliding movement on an elongated element pivotally attached to the base member for respectively utilizing the attachment device in fixed and floating modes of operation.

FIG. 3 is a top plan view of the attachment device of this invention, and more clearly illustrates the float, the block magnet and hooks or eyes forming the attaching elements for connection to containment booms.

FIG. 4 is a side elevational view of the attachment device of the invention, and illustrates a handle for carrying the same and means for connecting a line to the base member so that the line can be pulled to readily detach the attachment device and an associated containment boom without the need of a boat or any other waterborne transportation.

FIG. 5 is a fragmentary side elevational view, and illustrates one of the containment boom connecting means or hooks which is slidably received in a slot of an elongated element pivotally connected to the base member.

Figure 1:
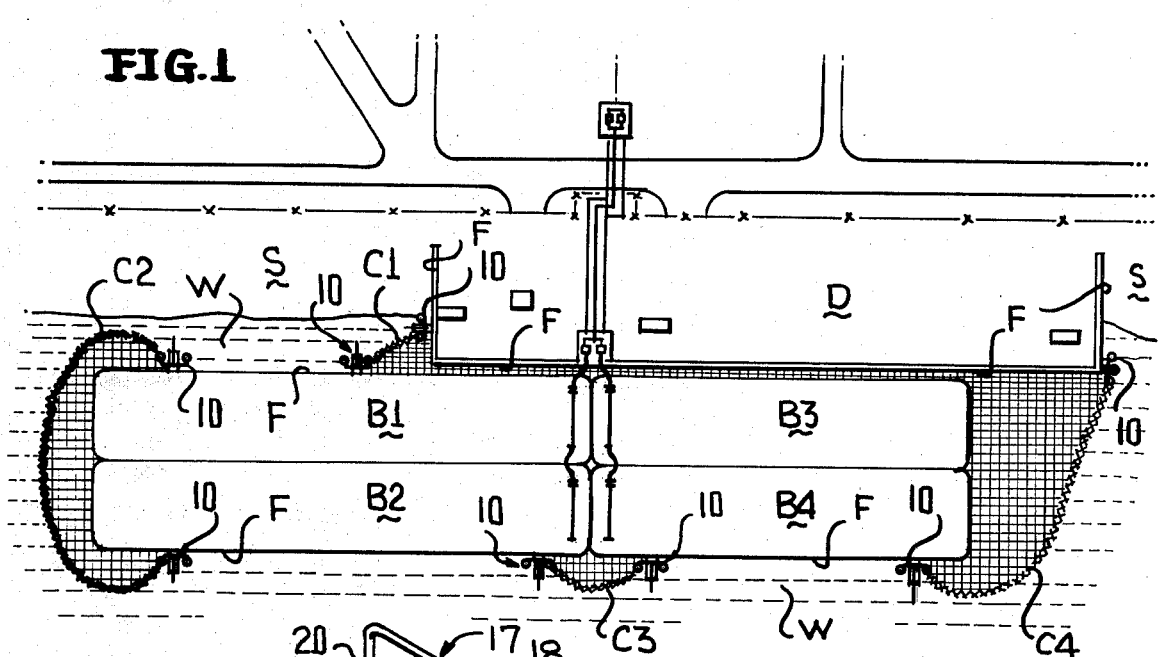
Figure 2:
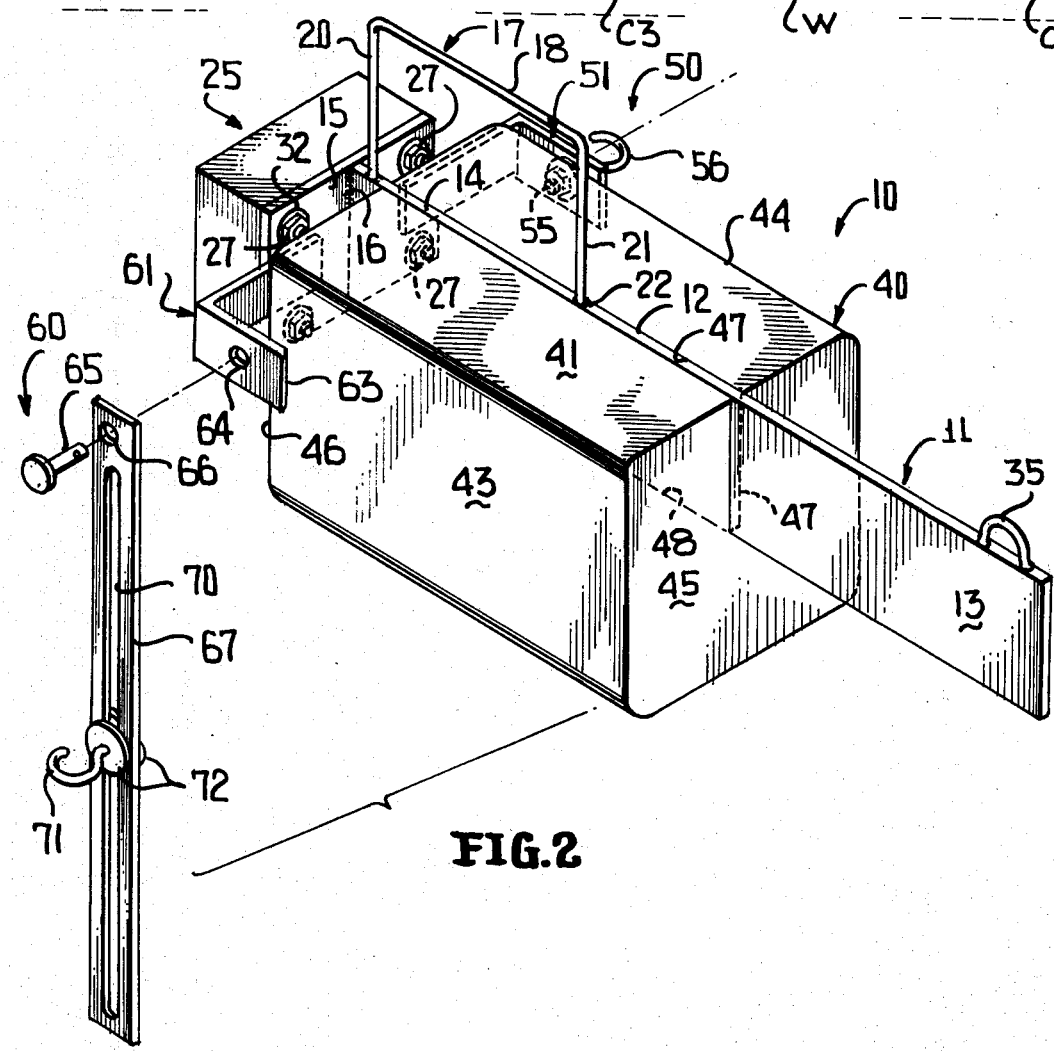

Reference is first made to FIG. 1 of the drawings which illustrates a typical containment boom deployment arrangement adjacent a shoreline S which includes a conventional dock D, both of which are associated with a body of water W, such as a harbor, river, lake or the like. A plurality of barges B1 through B4 are illustrated docked adjacent the dock D and associated therewith as well as with the dock D are a plurality of containment booms C1 through C4, each of which is of a conventional construction and is designed to contain a possible or an actual spill, such as oil, in the manner readily apparent in FIG. 1. Typical of such containment booms are those heretofore noted in the earlier-mentioned patents, particularly U.S. Pat. No. 3,630,891 which discloses a so-called "Conweld" heavy-duty sorbent boom which is a flexible, highly sorbent boom designed for open harbor, river and lake use. Its design allows it to be towed or left in place for up to several weeks. Such booms are manufactured from a unique water resistant vegetable fiber mat reinforced with a special polypropylene mesh, and a continuous olefin foam strip inside provides extra flotation so that the boom retains freeboard when fully saturated with oil. Such booms are manufactured by Environmental Products Division of Conwed Corporation, 332 Minnesota Street, St. Paul, Minnesota 55101. The containment booms C1 through C4 are each connected at ends thereof by attachment devices 10 of this invention to ferrometallic surfaces F of the barges or vessels B1 through B4, and like ferrometallic surfaces F of the dock D. The attachment devices in FIG. 1 are generally designated by the reference numeral 10, and the following detailed description is typical of each of the attachment devices with reference now being made specifically to FIGS. 2 through 5 of the drawings.

The attachment device 10 of FIGS. 2 through 5 includes a relatively flat elongated base member, base plate or float support arm 11 of a generally rectangular configuration which is preferably constructed from metallic material and includes a medial portion 12 and opposite terminal end portions 13, 14 to the latter of which is connected a generally rectangular plate 15 by appropriate welds 16. A generally inverted U-shaped carrying handle 17 is defined by a bight portion 18 and a pair of depending legs 20, 21 which are welded by welds 22, 23, respectively, to an upper edge (unnumbered) of the base member 11.

Means generally designated by the reference numeral 25 is carried by the base member 11 for magnetically attaching the attachment device 10 to any of the ferrometallic surfaces F, be they stationary such as the ferrometallic surfaces F of the dock D or floating, such as the ferrometallic surfaces F of any one of the barges B1 through B4. The magnetically attaching means 25 is a permanent block magnet of a generally rectangular configuration which is secured to the plate 15 by a plurality of threaded bolts 26 and nuts 27. The bolts 26 pass through bores 28 in the magnet 25 and heads 30 of the bolts 26 are received in counterbores 31 associated with each of the bores 28. A suitable lock washer 32 is positioned between each nut 27 and the associated plate 15. There are four such threaded bolts 26 and associated nuts 27 for rigidly though removably securing the block magnet 25 to the plate 15 of the base member 11. Obviously, due to the magnetic nature of the block magnet 25, the same will adhere itself to any of the ferrometallic surfaces F of the dock D or the barges B1 through B4, but by the same token, the attachment device 10 can be readily removed from such attachment by simply pulling upon a line L connected to line connecting means 35 in the form of a metallic loop which is connected by welds 36 to the end portion 13 of the base member 11. The manner of disconnecting the attachment device 10 from any of the ferrometallic surfaces F by utilizing the line L will be described more fully hereinafter.

Means generally designated by the reference numeral 40 is provided for imparting buoyancy to the base member 11 and/or the overall attachment device 10 relative to the body of water W. The buoyancy imparting means 40 is a float of a generally rectangular configuration defined by an upper surface 41, a lower surface 42, side surfaces 43, 44 and end surfaces 45, 46. The float 40 is constructed from most any type of buoyant material, such as polystyrene, balsa wood, cork, etc., and the upper surface 41 is interrupted by an upwardly opening slot 47 which also opens through the end surfaces 45, 46 and has a bottom 48. The slot 47 thereby receives and houses the medial portion 12 of the base member 11. The float 40 is connected to the medial portion 12 of the base member 11 by an appropriate adhesive or simply through the intermediary of nuts, bolts, and/or screws (not shown). Obviously, though the float 40 has been described as being of a generally square or cubic configuration, the same might be just as well constructed of a cylindrical shape, in which case the surfaces 41, 42, 43 and 44 would effectively be a single cylindrical surface and the end surfaces 45, 46 would be circular surfaces.

The attachment device 10 includes means 50 and 60 for connecting a containment boom to the attachment device 10 and in turn connecting through the block magnet 25 the attachment device 10 to an associated ferrometallic surface F.

The containment boom attaching means 50 is carried by a metallic angle bracket 51 which is secured by a weld 52 to the plate 15 of the attached device 10. A leg 53 of the angle bracket 51 has a circular aperture 54 through which passes a threaded shank or threaded portion 55 of a hook or eye bolt 56. A pair of washers 56, 58 are located on opposite sides of the leg 53, and a nut 59 fixedly connects the hook or eye bolt 56 to the leg 53 of the angle bracket 51. The containment boom attaching means 50 is specifically designed to have a containment boom C1 through C4 connected thereto when the block magnet 25 is connected to a fixed or immovable ferrometallic surface, as will be more apparent hereafter.

The containment boom attaching or connecting means 60 is similar to the containment boom attaching means 50 in that it includes a metallic angle bracket 61 secured by a weld 62 to the plate 15. The angle bracket 61 further includes a leg 63 having a circular opening or aperture 64 within which is pivotally mounted a cylindrical pivot pin 65 which is welded or otherwise fixed in a circular opening 66 (FIG. 2) of a depending elongated member 67. A conventional cotter pin or cotter key 68 passes through a diametrical bore (unnumbered) in the pin 65 and, thus, prevents the pin 65 from being withdrawn from the bore or aperture 64 unless, of course, the cotter key or cotter pin 68 is removed. The elongated element or member 67 has an elongated slot 70 along which slides a hook or eye bolt 71 which is identical in construction to the hook or eyebolt 56 and includes a washer 72 on each of the opposite sides of the elongated member 67 and a nut corresponding to the nut 59 connected to a threaded shank corresponding to the threaded shank 55 of the hook 56. Thus, the elongated member 67 is not only free to pivot about the axis of the pivot pin 65, but the hook or eye 71 can slide upwardly or downwardly in the elongated slot 70 and is confined and guided in its sliding motion by the washers 72 on the opposite sides or faces of the elongated member 67.

The diameters of the apertures 54, 64 are identical, as are the diameters of the threaded portion 55 of the hook 56 and the pivot pin 65 carried by the elongated member 67. Thus, though the attachment device 10 has been described with the containment boom attaching means 50 being fixed in the aperture 54 of the leg 55 of the angle bracket 51, it is to be understood that the attaching means 50 can be instead attached in the aperture 64 of the leg 63 of the containment boom attaching means 60. Similarly, the elongated member 67 along with the hook or eye 71 can be attached to the leg 53 of the angle bracket 51 by simply inserting the pivot pin 65 into the aperture 54 of the leg 53. In this manner, the attachment device 10 is not only adapted for fixed or sliding modes of operation, but the attaching means 50, 60 can be secured to either side of the attachment device 10 for essentially right or left hand connection to an associated ferrometallic surface F and an associated containment boom C1 through C4. Obviously, the fixed mode of operation is such that the attachment device 10 is attached to a ferrometallic surface which can reasonably be expected not to move relative to the associated water line. The fixed containment boom attaching means 50 and specifically the hook 56 thereof is fastened to either the right or left angle bracket 51 or 61 and vice versa, depending on which end of the particular containment boom C1 through C4 the floating attachment device 10 is to be connected and the containment boom is fastened to the fixed boom attachment hook 56. In the sliding mode of operation, the ferrometallic surface F to which the floating attachment device 10 is attached can be expected to rise or fall in the water and in this case the hook 71 is fastened to the appropriate support bracket 51 or 61 by means of a pivot pin 65, and the sliding boom attachment hook 71 is fastened to the containment boom with, of course, the block magnet 25 being attached to the floating ferrometallic surfaces.

As specific examples of the utilization of the attachment device 10, reference is again made to FIG. 1 and the attachment devices 10 connected to the ferrometallic surfaces F of the barges B1, B2 with the containment boom C2 connected therebetween. The containment boom C2 may be a single boom or a plurality of connected containment booms approximately 250 feet in length. Since the barges B1, B2 are expected to move relative to each other, the boom C2 is connected to each of the sliding hooks 71 of the attachment devices 10 and, of course, the latter are connected to the barges B1 and B2 by the block magnet 25 at a position such that the waterline WL (FIG. 4) is approximately at the horizontal centerline of the block magnet 25 and the base member 11. Thus, the float 40 augments the rise and fall of the attachment device 10 by imparting buoyancy thereto which precludes the block magnet 25 from being inadvertently or unintentionally disconnected from the ferrometallic surfaces F of the barges B1, B2 due to their motion. However, if it is desired to remove the attachment devices 10 from the barges B1, B2, the line L is merely pulled from, for example, a position along the shoreline S to break the magnetic attraction of the associated magnets 25 from the surfaces F. Since the line L is connected to the loop 35 at the terminal end portion 13 of the base member 11 remote from the block magnet 25, the base member 11 in effect constitutes a lever or lever arm with the float 40 functioning as the fulcrum, the clamping force at the block magnet 25 functioning as the point of load, and the line connecting loop 35 defining the point of force application to the base member or lever arm 11. Thus, as the line L is pulled, the lever 11 pivots about the fulcrum 40 resulting in the block magnet 25 pivoting about its uppermost or topmost edge, as viewed in FIG. 4 the right-hand edge, relative to any of the ferrometallic surfaces F. In this way, a person can detach the attachment device 10 without the need of a boat or any other waterborne means of transportation and can do so in a relative simple fashion due to the mechanical advantage achieved by the lever action effect of the base member 11.

Obviously, the attachment devices 10 can be connected to a containment boom in the sliding mode of operation, namely, the containment boom being connected to the sliding hooks or eye bolts 71 of the containment boom attaching means 60 in the manner shown in FIG. 5. The so-called sliding mode of operation is utilized where there is expected some relative movement between the waterline L, the containment booms C1 through C4 associated therewith on the one hand, and the attachment device 10 and the associated ferrometallic surface F on the other, as is indicated by the oppositely headed generally vertically directed unnumbered arrows in FIG. 5. Thus, as the attachment device 10 and the ferrometallic surface F moves upwardly or downwardly relative to the waterline L, the eye bolt or hook 72 will slide vertically up and down within the slot 70 and, of course, the elongated member 67 can also pivot about the pivot pin 65, thus accommodating for such relative motion.

It is also to be understood that depending on the particular application of any of the attachment devices 10, each attachment device 10 might include only the containment boom attaching means 50 carried by each of the brackets 50, 60 or only the sliding containment boom attaching means 60 carried by the brackets 50 and 60. In other words, the attachment devices 10 are so constructed that the means 50, 60 are essentially usable individually or in pairs and in an interchangeable fashion.

Although only a preferred embodiment of the invention has been specifically illustrated and described herein, it is to be understood that minor variations may be made in the apparatus without departing from the spirit and scope of the invention, as defined in the appended claims.

What I claim is:

1. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means is mounted for relative movment with respect to said base member.

2. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means is mounted for relative pivoting movement with respect to said base member.

3. The device as defined in claim 2 wherein said last-mentioned attaching means includes an elongated member pivotally attached at an end thereof to said base member.

4. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means is mounted for relative sliding movement with respect to said base member.

5. The device as defined in claim 4 wherein said last-mentioned attaching means includes an elongated member having a slot therein along which slides a portion of said attaching means.

6. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means is mounted for relative sliding and pivoting movement with respect to said base member.

7. The device as defined in claim 6 wherein said last-mentioned attaching means includes an elongated member pivotally attached at an end thereof to said base member, and said elongated member having a slot therein along which slides a portion of said attaching means.

8. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means includes first and second attaching members mounted at a fixed position and for relative movement respectively relative to said base member.

9. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means includes first and second attaching members mounted at a fixed position and for relative sliding movement respectively relative to said base member.

10. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby said device functions as the connecting intermediary between the ferrometallic surface and the floating element, and said last-mentioned attaching means includes first and second attaching members mounted at a fixed position and for relative pivoting movement respectively relative to said base member.

11. A device particularly adapted for attachment to a ferrometallic surface comprising a base member, means carried by said base member for magnetically attaching said base member to a ferrometallic surface, means carried by said base member for imparting buoyancy to said base member relative to a body of water, means carried by said base member for attaching said base member to a floating element whereby device functions as the connecting intermediary between the ferrometallic surface and the floating element, and said last-mentioned attaching means includes first and second attaching members mounted at a fixed position and for relative sliding and pivoting movement respectively relative to said base member.

12. A device particularly adapted for attachment to a surface comprising a base member, means carried by said base member for detachably attaching said base member to a surface, means carried by said base member for imparting buoyancy to said base member relative to a body of water sufficient to maintain the base member afloat upon its detachment from a surface, means carried by said base member for attaching said base member to a floating element whereby said device functions as the connecting intermediary between the surface and the floating element, and means for connecting a line to said base member for applying a force to the base member from a point remote therefrom to detach said base member from the surface and pull the floating base member via the line to a point of removal of the device from the body of water.

13. The device as defined in claim 12 wherein said base member includes an arm projecting in a direction away from said last-mentioned attaching means, and said arm carries said line connecting means.

14. The device as defined in claim 12 wherein said base member defines a lever arm of which said buoyancy imparting means defines the fulcrum, said last-mentioned attaching means defines the point of load and said line connecting means defines the point of force application.

15. The device as defined in claim 14 wherein said last-mentioned attaching means and said line connecting means are disposed on opposite sides of said buoyancy imparting means.

16. The device as defined in claim 14 wherein said last-mentioned attaching means is mounted for relative movement with respect to said base member.

17. The device as defined in claim 14 wherein said last-mentioned attaching means is mounted for relative pivoting movement with respect to said base member.

18. The device as defined in claim 14 wherein said last-mentioned attaching means is mounted for relative sliding movement with respect to said base member.

19. The device as defined in claim 14 wherein said last-mentioned attaching means is mounted for relative sliding and pivoting movement with respect to said base member.

20. A device particularly adapted for attachment to a ferrometallic surface comprising a base member in the form of an elongated arm having a medial portion and opposite end portions, means carried by said medial portion for imparting buoyancy to said base member relative to a body of water, means carried by a first of said opposite end portions for magnetically attaching said base member to a ferrometallic surface, means carried by a second of said opposite end portions for connecting a line thereto to apply a force to the base member to detach the magnetically attaching means from the ferrometallic surface, and means for attaching a floating containment boom to said base member whereby said device functions as the connecting intermediary between the ferrometallic surface and the floating containment boom.

21. The device as defined in claim 20 wherein said buoyancy imparting means is a flotation member.

22. The device as defined in claim 20 wherein said last-mentioned attaching means is located at a fixed position relative to said base member.

23. The device as defined in claim 20 wherein said last-mentioned attaching means is mounted for relative movement with respect to said base member.

24. The device as defined in claim 20 wherein said last-mentioned attaching means is mounted for relative pivoting movement with respect to said base member.

25. The device as defined in claim 20 wherein said last-mentioned attaching means is mounted for relative sliding movement with respect to said base member.

26. The device as defined in claim 20 wherein said last-mentioned attaching means is mounted for relative sliding and pivoting movement with respect to said base member.

27. The device as defined in claim 20 wherein said last-mentioned attaching means includes an elongated member pivotally attached to an end thereof to said base member.

28. The device as defined in claim 20 wherein said last-mentioned attaching means includes an elongated member having a slot therein along which slides a portion of said attaching means.

29. The device as defined in claim 20 wherein said last-mentioned attaching means includes an elongated member pivotally attached at an end thereof to said base member, and said elongated member having a slot therein along which slides a portion of said attaching means.

* * * * *